United States Patent
Chiu et al.

(10) Patent No.: US 9,013,153 B2
(45) Date of Patent: Apr. 21, 2015

(54) METHOD FOR CONTROLLING BATTERY RECHARGING PROCESS AND ELECTRONIC DEVICE

(75) Inventors: Pei-Lun Chiu, Taipei (TW);
Chia-Chang Chen, Taipei (TW);
Chih-Tarng Chuang, Taipei (TW);
Tsang-Ming Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 471 days.

(21) Appl. No.: 13/315,287

(22) Filed: Dec. 9, 2011

(65) Prior Publication Data

US 2012/0146590 A1 Jun. 14, 2012

Related U.S. Application Data

(60) Provisional application No. 61/421,213, filed on Dec. 9, 2010.

(51) Int. Cl.
*H02J 7/04* (2006.01)
*H02J 7/06* (2006.01)
*H02J 7/00* (2006.01)

(52) U.S. Cl.
CPC .................................. *H02J 7/0073* (2013.01)

(58) Field of Classification Search
CPC .......... H02J 7/0073; H02J 7/042; H02J 7/041
USPC ......................................... 320/155, 157, 159
See application file for complete search history.

(56) References Cited

U.S. PATENT DOCUMENTS

| | | | | |
|---|---|---|---|---|
| 4,396,880 A | * | 8/1983 | Windebank | 320/156 |
| 4,439,719 A | * | 3/1984 | Lambert et al. | 320/159 |
| 4,835,453 A | * | 5/1989 | Munning Schmidt et al. | 320/128 |
| 4,845,419 A | * | 7/1989 | Hacker | 320/136 |
| 5,530,911 A | * | 6/1996 | Lerner et al. | 340/7.38 |
| 5,712,795 A | * | 1/1998 | Layman et al. | 700/297 |
| 5,739,672 A | * | 4/1998 | Lane | 320/139 |
| 5,751,134 A | * | 5/1998 | Hoerner et al. | 320/124 |
| 5,955,869 A | * | 9/1999 | Rathmann | 320/132 |
| 6,424,123 B1 | * | 7/2002 | Odaohhara et al. | 320/134 |
| 7,202,632 B2 | * | 4/2007 | Namba | 320/132 |
| 7,843,171 B2 | * | 11/2010 | Schroeder et al. | 320/138 |

FOREIGN PATENT DOCUMENTS

CN 101004629 7/2007

OTHER PUBLICATIONS

"Office Action of Taiwan Counterpart Application", issued on Apr. 21, 2014, p. 1-p. 9.

* cited by examiner

Primary Examiner — M'Baye Diao
(74) Attorney, Agent, or Firm — Jianq Chyun IP Office

(57) ABSTRACT

A method for controlling battery recharging process is provided for an electronic device equipped with a battery. The method comprises entering a recharging smart mode. In the recharging smart mode, an actual capacity rate of the battery is determined. In the recharging smart mode, according to the actual capacity rate of the battery, a rechargeable capacity rate of the battery is changed. When the actual capacity rate is larger than a first capacity threshold value for a first predetermined time interval, the rechargeable capacity rate of the battery is decreased.

34 Claims, 3 Drawing Sheets

METHOD FOR CONTROLLING BATTERY RECHARGING PROCESS AND ELECTRONIC DEVICE

CROSS-REFERENCE TO RELATED APPLICATION

This application claims the priority benefits of U.S. provisional application Ser. No. 61/421,213, filed on Dec. 9, 2010. The entirety of the above-mentioned patent application is hereby incorporated by reference herein and made a part of this specification.

BACKGROUND OF THE INVENTION

1. Field of the Invention

The present invention generally relates to a control method and an electronic device, in particular, to a method for controlling battery recharging process and an electronic device executing the method.

2. Description of Related Art

Nowadays, notebook computer has become a very common product for mobile life. Especially for those who need to travel frequently for business, the notebook computer provides an office environment without space constraints, allowing people to enjoy the convenience of mobile digital life anytime and anywhere like in planes or cars. However, unlike an ordinary desktop computer, the notebook computer does not have a stable power supply environment. Therefore, how to enable the notebook computer to operate stably in various places has become an important subject.

During mobile operation, the notebook computer is generally powered by an equipped battery, and when the electric energy in the battery is exhausted, an external power supply is required to support operation of the notebook and meanwhile recharge the battery. In a discharging procedure, the battery discharges to variable discharge loads, and the discharging procedure is ended according to a set cut-off voltage (V-cut-off). In the discharging process of the battery, the user or electronic device may easily integrate the current output by the battery to obtain an output capacity that has been used. In addition, after a period of time of discharging, the voltage of the battery may instantly drop sharply. Therefore, the sharp drop of the voltage may cause aging of the battery, which is not conducive to the service life of the battery. Currently, when using the electronic device, the user often connects a power supply to the electronic device all the time to maintain the battery in a high voltage fully recharged state. When the battery is maintained in the high voltage state for a long time and does not undergo a complete recharging and discharging procedure, aging of the battery easily occurs, which shortens the service life of the battery.

SUMMARY OF THE INVENTION

Accordingly, the present invention is directed to a method for controlling battery recharging process, which can effectively prolong the service life of the battery.

The present invention is also directed to an electronic device, which can automatically control battery recharging, so as to adjust the recharging level of the battery properly according to dynamic changes of the electric quantity of the battery during use of the electronic device.

The present invention provides a method for controlling battery recharging process, for an electronic device equipped with a battery. The method includes: the electronic device receiving a power-up signal and being turned on to enter an operating system; the electronic device using a controller to determine whether a start signal of a recharging smart mode is received; after the controller receives the start signal of the recharging smart mode and enables the electronic device to enter the recharging smart mode, using the controller to determine an actual capacity rate of the battery; using the controller to change a rechargeable capacity rate of the battery according to the actual capacity rate of the battery, where when the actual capacity rate of the battery is larger than a first threshold value for a first predetermined time interval, the rechargeable capacity rate is decreased; continuously determining the actual capacity rate of the battery; and when the actual capacity rate of the battery is larger than a first threshold value for a second predetermined time interval, continuously decreasing the rechargeable capacity rate.

In an embodiment of the present invention, in the method for controlling battery recharging process, the first threshold value is a capacity threshold value and the first threshold value includes 50%.

In an embodiment of the present invention, in the method for controlling battery recharging process, when the actual capacity rate of the battery is smaller than a second threshold value, the rechargeable capacity rate is increased.

In an embodiment of the present invention, in the method for controlling battery recharging process, the second threshold value is a capacity threshold value and the first threshold value approximates the second threshold value.

In an embodiment of the present invention, in the method for controlling battery recharging process, the first predetermined time interval includes seven days.

In an embodiment of the present invention, the method for controlling battery recharging process further includes: receiving a battery control hotkey signal, so as to switch from the recharging smart mode to a full mode; and in the full mode, increasing the rechargeable capacity rate of the battery to a rechargeable capacity rate in a fully recharged state.

In an embodiment of the present invention, in the method for controlling battery recharging process, after increasing the rechargeable capacity rate of the battery to the rechargeable capacity rate in the fully recharged state, the method further includes: in the full mode, when the actual capacity rate of the battery is the rechargeable capacity rate in the fully recharged state for a third predetermined time interval, automatically switching from the full mode to the recharging smart mode.

In an embodiment of the present invention, in the method for controlling battery recharging process, the rechargeable capacity rate in the fully recharged state is about 90% to 100%.

In an embodiment of the present invention, in the method for controlling battery recharging process, the step of decreasing the rechargeable capacity rate when the actual capacity rate of the battery is larger than the first threshold value for the first predetermined time interval includes decreasing the rechargeable capacity rate by a predetermined decrease amount.

In an embodiment of the present invention, in the method for controlling battery recharging process, the step of increasing the rechargeable capacity rate when the actual capacity rate of the battery is smaller than the second threshold value includes increasing the rechargeable capacity rate by a predetermined increase amount.

In an embodiment of the present invention, in the method for controlling battery recharging process, when the actual capacity rate of the battery is larger than the first threshold value for a third predetermined time interval, the rechargeable capacity rate is continuously decreased.

In an embodiment of the present invention, in the method for controlling battery recharging process, the controller is an embedded controller.

In an embodiment of the present invention, in the method for controlling battery recharging process, the actual capacity rate is a percentage of a residual capacity of the battery after being used to a capacity of the battery after being fully recharged.

In an embodiment of the present invention, in the method for controlling battery recharging process, the rechargeable capacity rate is a percentage of a capacity of the battery after being used and recharged to a capacity of the battery after being fully recharged.

In an embodiment of the present invention, in the method for controlling battery recharging process, when the battery is being recharged and the actual capacity rate of the battery is larger than a first threshold value for a first predetermined time interval, the method further includes: judging whether the actual capacity rate of the battery is larger than the decreased rechargeable capacity rate; and when the actual capacity rate of the battery is larger than the decreased rechargeable capacity rate, stopping recharging the battery so that the actual capacity rate is smaller than or equal to the decreased rechargeable capacity rate.

In an embodiment of the present invention, in the method for controlling battery recharging process, the first time interval is smaller than the second time interval.

In an embodiment of the present invention, in the method for controlling battery recharging process, the decreased rechargeable capacity rate is larger than a third threshold value.

The present invention further provides an electronic device. The electronic device includes a battery, a computer-readable and writable storage device and a controller. The battery supplies an electric power to the electronic device. The computer-readable and writable storage device is used for storing a computer-readable and writable program. The controller is used for executing a plurality of instructions of the computer-readable and writable program. The instructions include: after the electronic device is started to enter an operating system, using a controller to determine whether a start signal of a recharging smart mode is received; after the controller receives the start signal of the recharging smart mode and enables the electronic device to enter the recharging smart mode, using the controller to determine an actual capacity rate of the battery; in the recharging smart mode, using the controller to change a rechargeable capacity rate of the battery according to the actual capacity rate of the battery, where when the actual capacity rate of the battery is larger than a first threshold value for a first predetermined time interval, the rechargeable capacity rate is decreased; continuously determining the actual capacity rate of the battery; and when the actual capacity rate of the battery is larger than a first threshold value for a second predetermined time interval, continuously decreasing the rechargeable capacity rate.

In an embodiment of the present invention, in the electronic device, the first threshold value is a capacity threshold value and the capacity threshold value includes 50%.

In an embodiment of the present invention, in the electronic device, when the actual capacity rate of the battery is smaller than a second threshold value, the rechargeable capacity rate is increased.

In an embodiment of the present invention, in the electronic device, the second threshold value is a capacity threshold value and the first capacity threshold value approximates the second capacity threshold value.

In an embodiment of the present invention, in the electronic device, the first predetermined time interval includes ten days.

In an embodiment of the present invention, in the electronic device, the instructions further include: receiving a battery control hotkey signal, so as to switch from the recharging smart mode to a full mode; and in the full mode, changing the rechargeable capacity rate of the battery to a rechargeable capacity rate in a fully recharged state.

In an embodiment of the present invention, in the electronic device, after changing the rechargeable capacity rate of the battery to the rechargeable capacity rate in the fully recharged state, the instructions further include: in the full mode, when the actual capacity rate of the battery is the rechargeable capacity rate in the fully recharged state for a third predetermined time interval, automatically switching from the full mode to the recharging smart mode.

In an embodiment of the present invention, in the electronic device, the rechargeable capacity rate in the fully recharged state is about 90% to 100%.

In an embodiment of the present invention, in the electronic device, the instruction of decreasing the rechargeable capacity rate when the actual capacity rate of the battery is larger than the first threshold value for the first predetermined time interval includes decreasing the rechargeable capacity rate by a predetermined decrease amount.

In an embodiment of the present invention, in the electronic device, the instruction of increasing the rechargeable capacity rate when the actual capacity rate of the battery is smaller than the second threshold value includes increasing the rechargeable capacity rate by a predetermined increase amount.

In an embodiment of the present invention, in the electronic device, when the actual capacity rate of the battery is larger than the first threshold value for a third predetermined time interval, the rechargeable capacity rate is continuously decreased.

In an embodiment of the present invention, in the electronic device, the controller is an embedded controller.

In an embodiment of the present invention, in the electronic device, the actual capacity rate is a percentage of a residual capacity of the battery after being used to a capacity of the battery after being fully recharged.

In an embodiment of the present invention, in the electronic device, the rechargeable capacity rate is a percentage of a capacity of the battery after being used and recharged to a capacity of the battery after being fully recharged.

In an embodiment of the present invention, in the electronic device, when the battery is being recharged and the actual capacity rate of the battery is larger than a first threshold value for a first predetermined time interval, the instructions further include: judging whether the actual capacity rate of the battery is larger than the decreased rechargeable capacity rate; and when the actual capacity rate of the battery is larger than the decreased rechargeable capacity rate, stopping recharging the battery so that the actual capacity rate is smaller than or equal to the decreased rechargeable capacity rate.

In an embodiment of the present invention, in the electronic device, the first time interval is smaller than the second time interval.

In an embodiment of the present invention, in the electronic device, the decreased rechargeable capacity rate is larger than a third threshold value.

Based on the above, through the present invention, in the recharging smart mode, the electronic device automatically detects the actual capacity rate of the battery, and determines a magnitude relationship between the actual capacity rate of the battery and the set threshold value, and accordingly, automatically adjusts the set value of the rechargeable capacity rate of the battery. In the full mode, when the electronic device detects that no user uses the electronic device and the actual capacity rate of the battery is 100%, the electronic device automatically switches from the full mode to the recharging smart mode, so as to adjust the recharging rate of the battery properly according to dynamic changes of the electric quantity of the battery during use of the electronic device, thereby prolonging the service life of the battery.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
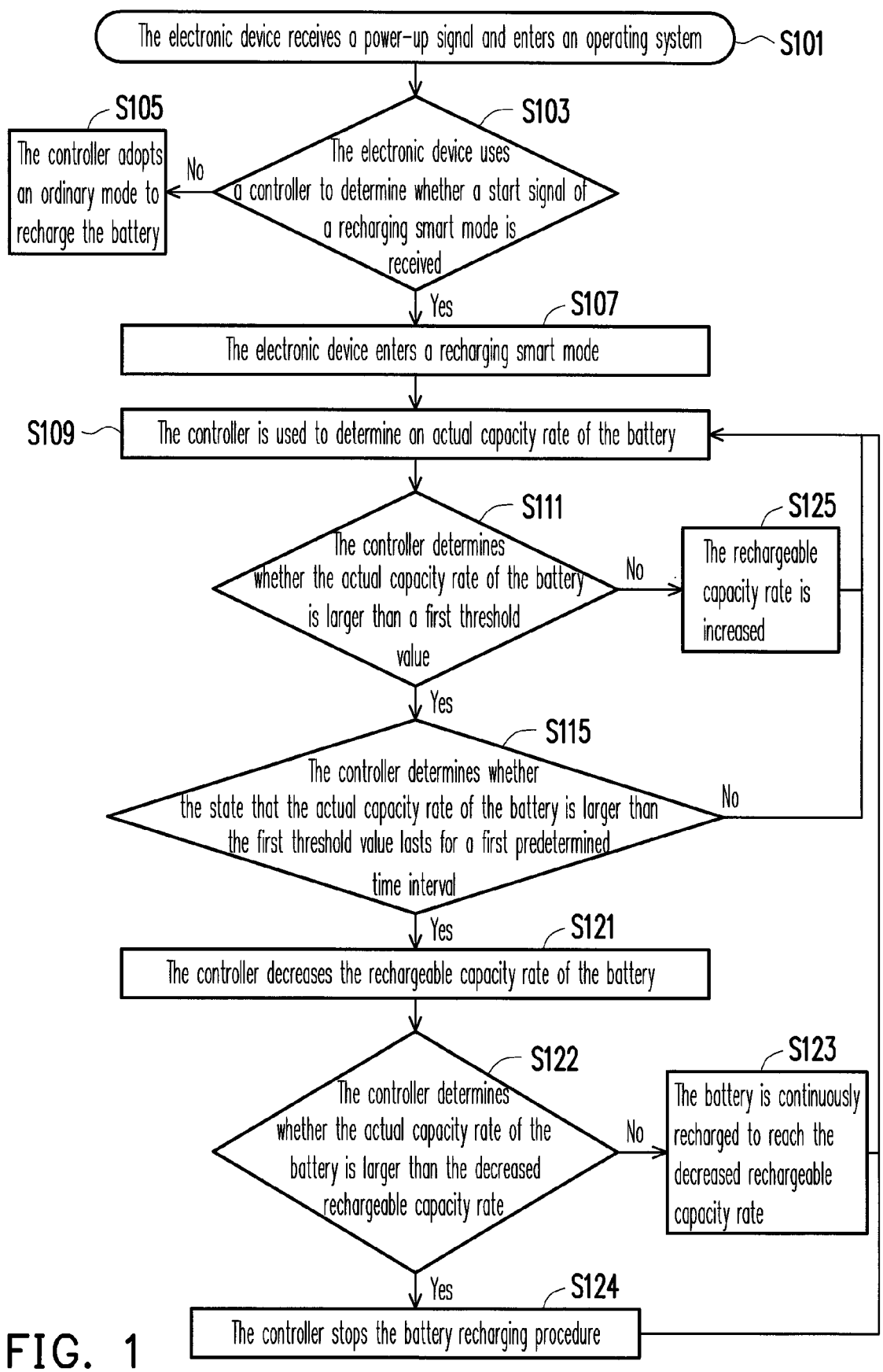
FIG. 1 is a schematic flowchart of a method for controlling battery recharging process according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic flowchart of a method for controlling battery recharging process according to an embodiment of the present invention. Referring to FIG. 1, the method for controlling battery recharging process of this embodiment is applied to an electronic device equipped with a battery, where the electronic device is connected to a transformer for recharging the battery. In Step S101, first, the electronic device receives a power-up signal and is turned on to enter an operating system, where the operating system may be a Microsoft operating system or an open source code operating system, but the scope of the present invention is not limited thereto. In Step S103, the electronic device uses a controller to determine whether a start signal of a recharging smart mode is received, where the recharging smart mode is a smart recharging control mode. If the controller does not receive the start signal of the recharging smart mode, the controller of the electronic device adopts an ordinary mode to recharge the battery (Step S105), where the ordinary mode is that the battery continuously receives the electric energy transferred from the transformer and is thus recharged, so that an actual capacity rate of the battery is continuously equal to a rechargeable capacity rate. When the controller receives the start signal of the recharging smart mode, the electronic device enters a recharging smart mode, so as to automatically control battery recharging according to the actual using state of the battery equipped in the electronic device (Step S107). In the present invention, the electronic device may enter the recharging smart mode upon being started by a user. In an embodiment, the electronic device interacts with the user to receive a battery control mode selecting signal, and enters the recharging smart mode according to the battery control mode selecting signal. The interaction between the electronic device and the user includes that the electronic device provides a man-machine interface, and the user determines through the man-machine interface whether to enter the recharging smart mode, and thus generates a battery control mode selecting signal. In addition, in still another embodiment, the interaction between the electronic device and the user includes that the user directly presses a control hotkey (for example, physical key or virtual key), so that the electronic device receives the control hotkey signal, and enters the recharging smart mode accordingly.

In Step S109, in the recharging smart mode, a controller of the electronic device is used to determine an actual capacity rate of the battery, that is, relative state of charge (RSOC) of the battery after the electronic device uses the battery. The RSOC of the battery is a percentage of a residual capacity of the battery after being used to a capacity of the battery after being fully recharged, where the capacity of the battery is usually provided in milliampere-hours (mAh). The controller of the electronic device may be a processor or an embedded controller (EC), but the scope of the present invention is not limited thereto.

Then, in Step S111, in the recharging smart mode, it is determined whether the actual capacity rate of the battery is larger than a first threshold value, where the first threshold value is a capacity threshold value. When the actual capacity rate of the battery is larger than the first threshold value, it is determined in Step S115 whether the state that the actual capacity rate of the battery is larger than the first threshold value lasts for a first predetermined time interval. When the state that the actual capacity rate of the battery is larger than the first threshold value does not last for the first predetermined time interval, the process returns to Step S109. The first threshold value is, for example, 50%, and the first predetermined time interval is, for example, ten days. Moreover, in an embodiment, the first threshold value may be a customized threshold value set by the user. In still another embodiment, for the first threshold value, a statistical program run in the recharging smart mode may periodically collect statistics regarding a usage habit (including battery use rate and recharging frequency) of the user using the electronic device within a particular period of time, so as to obtain an optimal first threshold value for a single user.

In Step S121, when the controller determines that the actual capacity rate of the battery is larger than the first threshold value for the first predetermined time interval, it indicates that the user have connected a power supply to the electronic device for a long time, which may shorten the service life of the battery. At this time, the controller decreases the rechargeable capacity rate of the battery, and the process returns to Step S109. The rechargeable capacity rate is a percentage of a capacity of the battery after being used and recharged to a capacity of the battery after being fully recharged, where the capacity of the battery is usually provided in milliampere-hours (mAh). Decreasing the rechargeable capacity rate of the battery is decreasing the capacity of the battery after being used and recharged, so as to prevent the battery from being maintained in a high voltage state to reduce the service life of the battery. In an embodiment, when the actual capacity rate of the battery is larger than the first threshold value for the first predetermined time interval, the rechargeable capacity rate is decreased by a predetermined decrease amount, for example, 10%. In still another embodiment, the method of decreasing the rechargeable capacity rate when the actual capacity rate of the battery is larger than the first threshold value for the first predetermined time interval further includes decreasing the rechargeable capacity rate to different rechargeable capacity rates according to the first predetermined time interval, a second predetermined time interval and a fourth predetermined time interval, where the first predetermined time interval is smaller than the second predetermined time interval and the second predetermined time interval is smaller than the fourth predetermined time interval. For example, when the actual capacity rate of the battery is larger than the first threshold value for the first predetermined time interval being ten days, the rechargeable capacity rate is decreased to 90%. When the actual capacity rate of the battery is larger than the first threshold value for the second predetermined time interval being twenty days, the rechargeable capacity rate is continuously decreased to 80%. When the actual capacity rate of the battery is larger than the first threshold value for the fourth predetermined time interval being thirty days, the rechargeable capacity rate is continuously decreased to 70%, and so on. In Step S121, when the transformer continuously recharges the battery in the electronic device and the actual capacity rate of the battery is larger than the first threshold value for the first predetermined time interval, the controller decreases the rechargeable capacity rate of the battery first, and then determines whether the actual capacity rate of the battery is larger than the decreased rechargeable capacity rate (Step S122). When the actual capacity rate of the battery is smaller than the rechargeable capacity rate of the battery, the battery is continuously recharged to reach the decreased rechargeable capacity rate (Step S123). When the actual capacity rate of the battery is larger than the decreased rechargeable capacity rate, the controller stops the battery recharging procedure of the transformer first (S124), and does not resume the battery recharging procedure until the actual capacity rate of the battery is smaller than or equal to the decreased rechargeable capacity rate. However, if the rechargeable capacity rate of the battery continuously decreases and eventually the battery cannot be recharged, the service life of the battery is shortened. To solve this problem, the rechargeable capacity rate of the battery has a third threshold value, where the third threshold value is a minimum value of the rechargeable capacity rate and the minimum value is generally set to 60%. When the transformer is connected to the electronic device and recharges the battery for a long time, the electronic device enters the recharging smart mode to decrease the rechargeable capacity rate of the battery, and the decreased rechargeable capacity rate must be larger than the third threshold value.

On the other hand, in Step S125, when the actual capacity rate of the battery is smaller than the second threshold value, the rechargeable capacity rate is increased, where the second threshold value is a capacity threshold value. Depending on different product designs, the second threshold value may be different from the first threshold value or the second threshold value may approximate the first threshold value, but the scope of the present invention is not limited thereto. The first threshold value, the second threshold value and the third threshold value may be stored in a computer-readable and writable storage device, but the scope of the present invention is not limited thereto. In an embodiment, when the actual capacity rate of the battery is smaller than the second threshold value, the rechargeable capacity rate is increased by a predetermined increase amount, for example, 10%. The second threshold value may be a customized threshold value set by the user. In still another embodiment, for the second threshold value, a statistical program run in the recharging smart mode may periodically collect statistics regarding a usage habit (including battery use rate and recharging frequency) of the user using the electronic device within a particular period of time, so as to obtain an optimal second threshold value for a single user. Depending on different product designs, a maximum value of the increased rechargeable capacity rate is about 100%.

In the embodiment shown in FIG. 1, in the recharging smart mode, the electronic device automatically detects the actual capacity rate of the battery, and determines a magnitude relationship between the actual capacity rate of the battery and the set threshold value, and accordingly, automatically adjusts the set value of the rechargeable capacity rate of the battery. Therefore, the recharging rate of the battery can be adjusted properly according to dynamic changes of the electric quantity of the battery during use of the electronic device, thereby prolonging the service life of the battery. However, when the user urgently requires fully recharging the battery, and intends to rely on the battery as a power supply for a short time without recharging, the electronic device must be switched from the recharging smart mode to a full mode, so as to adapt to requirements of the user in use.

Figure 2:
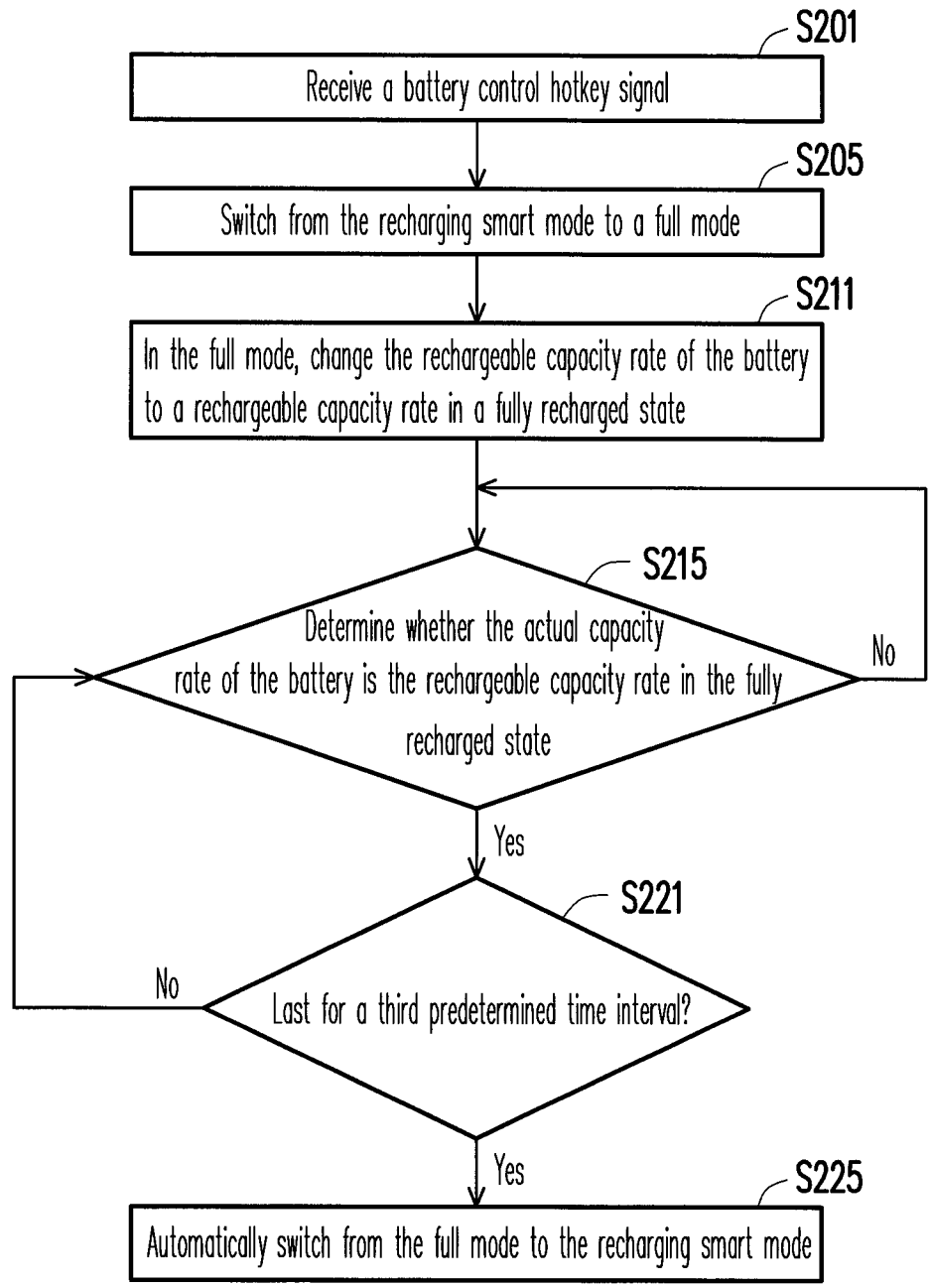
FIG. 2 is a schematic flowchart of switching between a recharging smart mode and a full mode in a method for controlling battery recharging process according to an embodiment of the present invention.

FIG. 2 is a schematic flowchart of switching between a recharging smart mode and a full mode in a method for controlling battery recharging process according to an embodiment of the present invention. Referring to FIG. 2, as described above, in this embodiment, when the user intends to switch the electronic device from the recharging smart mode to the full mode, the user may press a battery control hotkey (for example, physical key or virtual key) to generate a battery control hotkey signal. In Step S201, the electronic device receives the battery control hotkey signal. Then, the electronic device switches from the recharging smart mode to a full mode according to the received battery control hotkey signal (Step S205). Next, in Step S211, in the full mode, the rechargeable capacity rate of the battery is changed to a rechargeable capacity rate in a fully recharged state, so that the user can normally use the electronic device for a period of time when the electronic device is not connected an external power supply. Depending on the environment where the battery is used and the aging phenomenon of the battery, the rechargeable capacity rate in the fully recharged state is about 90% to 100%, but the present invention is not limited thereto.

Afterward, in Step S215, in the full mode, it is determined whether the actual capacity rate of the battery is the rechargeable capacity rate in the fully recharged state. If not, the process returns to Step S215. If yes, in Step S221, when the actual capacity rate of the battery is the rechargeable capacity rate in the fully recharged state, it is determined whether the condition lasts for a third predetermined time interval. The third predetermined time interval is, for example, seven days. When it is determined that the actual capacity rate of the battery is the rechargeable capacity rate in the fully recharged state, but the condition does not last for the third predetermined time interval, the process returns to Step S215. If yes, in Step S225, when the actual capacity rate of the battery is the rechargeable capacity rate in the fully recharged state for the third predetermined time interval, the full mode is automatically switched to the recharging smart mode. That is, when the electronic device finds that the user connects the electronic device to a power supply for a long time to maintain the actual capacity rate of the battery at the rechargeable capacity rate in the fully recharged state (that is, the actual capacity rate is maintained at a high rate for a long time), the electronic device automatically switches from the full mode to the recharging smart mode, so as to adjust the recharging rate of the battery properly according to dynamic changes of the electric quantity of the battery during use of the electronic device, thereby prolonging the service life of the battery.

Figure 3:
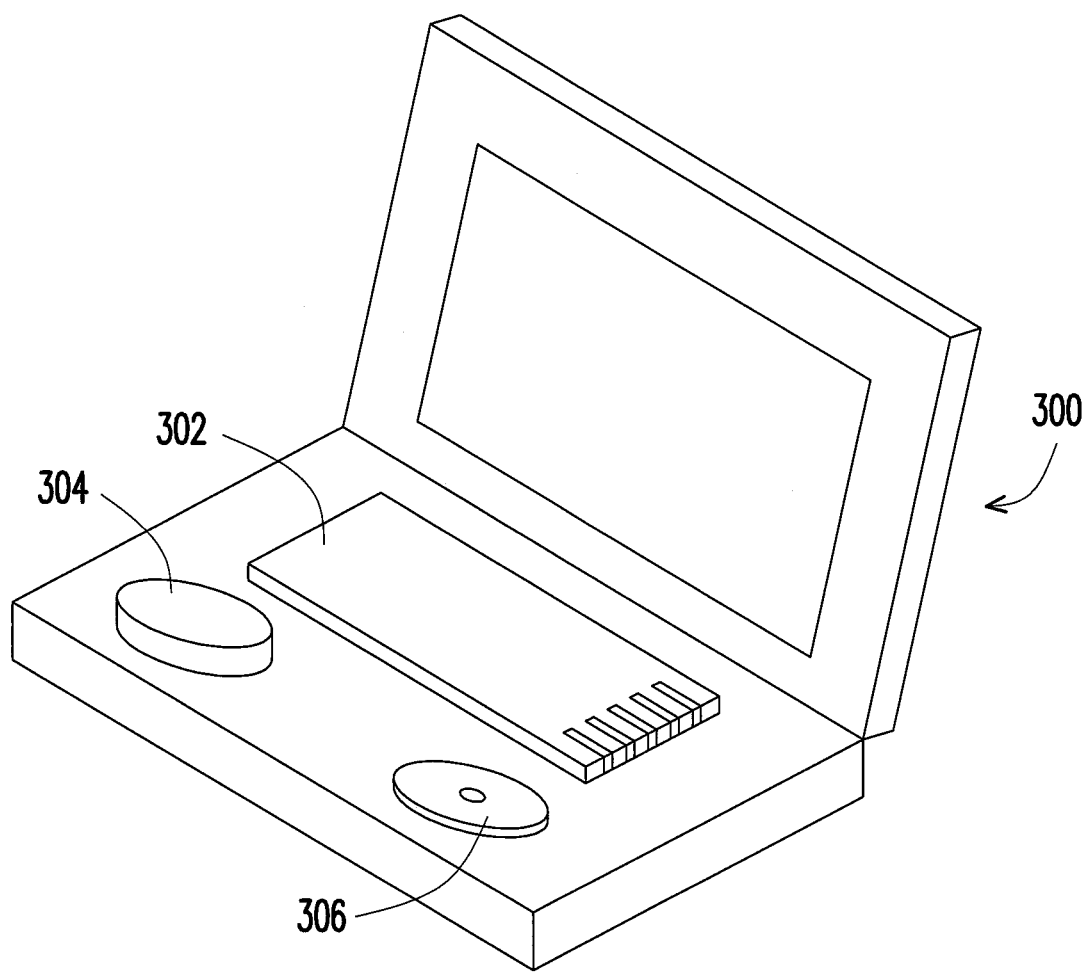
FIG. 3 is a schematic view of an electronic device according to an embodiment of the present invention.

FIG. 3 is a schematic view of an electronic device according to an embodiment of the present invention. The electronic device of the present invention may be a notebook computer, smart phone or other electronic devices equipped with a rechargeable battery and capable of being directly hardware-connected to an external power supply for recharging. Referring to FIG. 3, the electronic device in this embodiment is, for example, a notebook computer, but the present invention is not limited thereto. The electronic device 300 includes a battery 302, a computer-readable and writable storage device 304 and a controller 306. The battery 302 is used for supplying an electric power to the electronic device 300. The computer-readable and writable storage device 304 is used for storing a computer-readable and writable program. The controller 306 is used for executing a plurality of instructions of the computer-readable and writable program, so as to specifically implement the method for controlling battery recharging process described in the above embodiments. The controller 306 executes the instructions of the computer-readable and writable program in the same manner as the steps (S101 to S125 and S201 to S225) described in the above embodiments, and the details will not be described herein.

Based on the above, through the present invention, in the recharging smart mode, the electronic device automatically detects the actual capacity rate of the battery, and determines a magnitude relationship between the actual capacity rate of the battery and the set threshold value, and accordingly, automatically adjusts the set value of the rechargeable capacity rate of the battery. In the full mode, when the electronic device detects that no user uses the electronic device and the actual capacity rate of the battery is 100%, the electronic device automatically switches from the full mode to the recharging smart mode, so as to adjust the recharging rate of the battery properly according to dynamic changes of the electric quantity of the battery during use of the electronic device, thereby prolonging the service life of the battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling battery recharging process, for an electronic device equipped with a battery, the method comprising:
   the electronic device receiving a power-up signal and being turned on to enter an operating system;
   the electronic device using a controller to determine whether a start signal of a recharging smart mode is received;
   after the controller receives the start signal of the recharging smart mode and enables the electronic device to enter the recharging smart mode, using the controller to determine an actual capacity rate of the battery;
   using the controller to change a rechargeable capacity rate of the battery according to the actual capacity rate of the battery, wherein when the actual capacity rate of the battery is larger than a first threshold value for a first predetermined time interval, the rechargeable capacity rate is decreased;
   continuously determining the actual capacity rate of the battery; and
   when the actual capacity rate of the battery is larger than the first threshold value for a second predetermined time interval, continuously decreasing the rechargeable capacity rate.

2. The method for controlling battery recharging process according to claim 1, wherein the first threshold value is a capacity threshold value and the first threshold value comprises 50%.

3. The method for controlling battery recharging process according to claim 1, wherein when the actual capacity rate of the battery is smaller than a second threshold value, the rechargeable capacity rate is increased.

4. The method for controlling battery recharging process according to claim 3, wherein the second threshold value is a capacity threshold value and the first threshold value approximates the second threshold value.

5. The method for controlling battery recharging process according to claim 3, wherein the step of increasing the rechargeable capacity rate when the actual capacity rate of the battery is smaller than the second threshold value comprises increasing the rechargeable capacity rate by a predetermined increase amount.

6. The method for controlling battery recharging process according to claim 3, wherein the controller is an embedded controller.

7. The method for controlling battery recharging process according to claim 1, wherein the first predetermined time interval comprises seven days.

8. The method for controlling battery recharging process according to claim 1, further comprising:
   receiving a battery control hotkey signal, so as to switch from the recharging smart mode to a full mode; and
   in the full mode, increasing the rechargeable capacity rate of the battery to a rechargeable capacity rate in a fully recharged state.

9. The method for controlling battery recharging process according to claim 8, wherein after increasing the rechargeable capacity rate of the battery to the rechargeable capacity rate in the fully recharged state, the method further comprises:
   in the full mode, when the actual capacity rate of the battery is the rechargeable capacity rate in the fully recharged state for a third predetermined time interval, automatically switching from the full mode to the recharging smart mode.

10. The method for controlling battery recharging process according to claim 9, wherein the rechargeable capacity rate in the fully recharged state is about 90% to 100%.

11. The method for controlling battery recharging process according to claim 1, wherein the step of decreasing the rechargeable capacity rate when the actual capacity rate of the battery is larger than the first threshold value for the first predetermined time interval comprises decreasing the rechargeable capacity rate by a predetermined decrease amount.

12. The method for controlling battery recharging process according to claim 1, wherein when the actual capacity rate of the battery is larger than the first threshold value for a third predetermined time interval, the rechargeable capacity rate is continuously decreased.

13. The method for controlling battery recharging process according to claim 1, wherein the actual capacity rate is a percentage of a residual capacity of the battery after being used to a capacity of the battery after being fully recharged.

14. The method for controlling battery recharging process according to claim 1, wherein the rechargeable capacity rate is a percentage of a capacity of the battery after being used and recharged to a capacity of the battery after being fully recharged.

15. The method for controlling battery recharging process according to claim 1, wherein when the battery is being recharged and the actual capacity rate of the battery is larger than a first threshold value for a first predetermined time interval, the method further comprises:
   judging whether the actual capacity rate of the battery is larger than the decreased rechargeable capacity rate; and
   when the actual capacity rate of the battery is larger than the decreased rechargeable capacity rate, stopping recharging the battery so that the actual capacity rate is smaller than or equal to the decreased rechargeable capacity rate.

16. The method for controlling battery recharging process according to claim 1, wherein the first time interval is smaller than the second time interval.

17. The method for controlling battery recharging process according to claim 1, wherein the decreased rechargeable capacity rate is larger than a third threshold value.

18. An electronic device, comprising:
   a battery, for supplying an electric power to the electronic device;
   a controller, wherein after the electronic device is started to enter an operating system, the controller determines whether a start signal of a recharging smart mode is received,
   wherein after the controller receives the start signal of the recharging smart mode and enables the electronic device to enter the recharging smart mode, the controller determines an actual capacity rate of the battery,
   wherein in the recharging smart mode, the controller changes a rechargeable capacity rate of the battery according to the actual capacity rate of the battery, wherein when the actual capacity rate of the battery is larger than a first threshold value for a first predetermined time interval, the rechargeable capacity rate is decreased,
   wherein the controller continuously determines the actual capacity rate of the battery, and
   wherein when the actual capacity rate of the battery is larger than the first threshold value for a second predetermined time interval, the controller continuously decreases the rechargeable capacity rate.

19. The electronic device according to claim 18, wherein the first threshold value is a capacity threshold value and the capacity threshold value comprises 50%.

20. The electronic device according to claim 18, wherein when the actual capacity rate of the battery is smaller than a second threshold value, the controller increases the rechargeable capacity rate.

21. The electronic device according to claim 20, wherein the second threshold value is a capacity threshold value and the first capacity threshold value approximates the second capacity threshold value.

22. The electronic device according to claim 20, wherein when the actual capacity rate of the battery is smaller than the second threshold value, the controller increases the rechargeable capacity rate by a predetermined increase amount.

23. The electronic device according to claim 18, wherein the first predetermined time interval comprises ten days.

24. The electronic device according to claim 18, wherein the controller receives a battery control hotkey signal, so as to switch from the recharging smart mode to a full mode, and wherein in the full mode, the controller changes the rechargeable capacity rate of the battery to a rechargeable capacity rate in a fully recharged state.

25. The electronic device according to claim 24, wherein after the controller changes the rechargeable capacity rate of the battery to the rechargeable capacity rate in the fully recharged state,
   in the full mode, when the actual capacity rate of the battery is the rechargeable capacity rate in the fully recharged state for a third predetermined time interval, the controller further automatically switches from the full mode to the recharging smart mode.

26. The electronic device according to claim 24, wherein the rechargeable capacity rate in the fully recharged state is about 90% to 100%.

27. The electronic device according to claim 18, wherein when the actual capacity rate of the battery is larger than the first threshold value for the first predetermined time interval, the controller decreases the rechargeable capacity rate by a predetermined decrease amount.

28. The electronic device according to claim 18, wherein when the actual capacity rate of the battery is larger than the first threshold value for a third predetermined time interval, the controller continuously decreases the rechargeable capacity rate.

29. The electronic device according to claim 18, wherein the controller is an embedded controller.

30. The electronic device according to claim 18, wherein the actual capacity rate is a percentage of a residual capacity of the battery after being used to a capacity of the battery after being fully recharged.

31. The electronic device according to claim 18, wherein the rechargeable capacity rate is a percentage of a capacity of the battery after being used and recharged to a capacity of the battery after being fully recharged.

32. The electronic device according to claim 18, wherein when the battery is being recharged and the actual capacity rate of the battery is larger than a first threshold value for a first predetermined time interval,
   the controller further judges whether the actual capacity rate of the battery is larger than the decreased rechargeable capacity rate, and wherein
   when the actual capacity rate of the battery is larger than the decreased rechargeable capacity rate, the controller stops recharging the battery so that the actual capacity rate is smaller than or equal to the decreased rechargeable capacity rate.

33. The electronic device according to claim 18, wherein the first time interval is smaller than the second time interval.

34. The electronic device according to claim 18, wherein the decreased rechargeable capacity rate is larger than a third threshold value.

* * * * *